United States Patent
Gillihan

(10) Patent No.: US 7,490,432 B2
(45) Date of Patent: Feb. 17, 2009

(54) REFILLABLE BAIT BAG AND INTEGRATED HOOK

(76) Inventor: Michael A. Gillihan, 2458 N. 42$^{nd}$ Rd., Sheridan, IL (US) 60551

( * ) Notice: Subject to any disclaimer, the term of this patent is extended or adjusted under 35 U.S.C. 154(b) by 0 days.

(21) Appl. No.: 11/726,802

(22) Filed: Mar. 23, 2007

(65) Prior Publication Data
US 2008/0229650 A1 Sep. 25, 2008

(51) Int. Cl.
*A01K 83/06* (2006.01)
(52) U.S. Cl. .............. 43/41; 43/44.2; 43/44.4; 43/44.8
(58) Field of Classification Search ............ 43/44.2, 43/44.4, 44.8, 42.06, 44.99, 41; 383/117, 383/61.1, 61.3, 66
See application file for complete search history.

(56) References Cited

U.S. PATENT DOCUMENTS

| | | | | |
|---|---|---|---|---|
| 422,226 A * | 2/1890 | Kestner | ............. | 43/41 |
| 556,494 A * | 3/1896 | Dales | ............. | 43/41 |
| 636,694 A * | 11/1899 | Pflueger | ............. | 43/41 |
| 856,867 A * | 6/1907 | Hayward | ............. | 43/41 |
| 862,150 A * | 8/1907 | Fredricks | ............. | 43/41 |
| 933,818 A * | 9/1909 | Beatty | ............. | 43/41 |
| 1,278,146 A * | 9/1918 | Henthorn | ............. | 43/41 |
| 1,338,856 A * | 5/1920 | Cote | ............. | 43/41 |
| 1,516,174 A * | 11/1924 | Cox et al. | ............. | 43/41 |
| 1,841,956 A * | 1/1932 | Juergens | ............. | 43/55 |
| 2,040,559 A * | 5/1936 | Luttrell | ............. | 43/55 |
| 2,102,739 A * | 12/1937 | Peters | ............. | 43/41 |
| 2,115,493 A * | 4/1938 | Kosten | ............. | 43/44.8 |
| 2,167,334 A * | 7/1939 | Hayes | ............. | 43/42.06 |
| 2,183,816 A * | 12/1939 | Lovelace | ............. | 43/42.06 |
| 2,205,472 A * | 6/1940 | Fagerholm | ............. | 43/41 |
| 2,241,314 A * | 5/1941 | Mohler | ............. | 43/55 |
| 2,253,688 A * | 8/1941 | Collins | ............. | 43/55 |
| 2,260,705 A * | 10/1941 | Eguchi | ............. | 43/41 |
| 2,302,206 A * | 11/1942 | Gibson et al. | ............. | 43/41 |
| 2,318,735 A * | 5/1943 | Bickford | ............. | 383/66 |
| 2,323,318 A * | 7/1943 | Farkas | ............. | 43/55 |
| 2,402,730 A * | 6/1946 | Bucks | ............. | 43/44.4 |
| 2,463,369 A * | 3/1949 | Finlay et al. | ............. | 43/44.4 |
| 2,480,042 A * | 8/1949 | Nelson | ............. | 43/44.4 |
| 2,482,721 A * | 9/1949 | Sigmundi | ............. | 43/44.2 |
| 2,513,548 A * | 7/1950 | Buss | ............. | 43/44.8 |
| 2,541,847 A * | 2/1951 | Van Kirk | ............. | 43/41 |
| 2,555,088 A * | 5/1951 | Irwin | ............. | 43/42.06 |
| 2,556,634 A * | 6/1951 | Redinger | ............. | 43/41 |

(Continued)

FOREIGN PATENT DOCUMENTS

EP 1541020 A1 * 6/2005

(Continued)

*Primary Examiner*—Darren W Ark
(74) *Attorney, Agent, or Firm*—Erickson Law Group, PC

(57) ABSTRACT

A bait bag and hook combination is provided for use in fishing. The bait bag and hook combination includes a bag that is fixedly mounted on the hook in such a way that the bag does not hinder the hooks ability to impale game fish. The bag includes an easy-opening and re-closing apparatus for efficient refilling of the bag. In addition, the bag is made up of material that is durable enough to withstand the underwater environment, but is also permeable enough to release the scent of the bait contained inside.

12 Claims, 3 Drawing Sheets

U.S. PATENT DOCUMENTS

| | | | | |
|---|---|---|---|---|
| 2,564,216 A * | 8/1951 | Stark | ............................ | 43/44.8 |
| 2,598,011 A * | 5/1952 | Pitre | ............................ | 43/44.8 |
| 2,600,314 A * | 6/1952 | Miner | ............................ | 43/41 |
| 2,600,673 A * | 6/1952 | Murray | ............................ | 43/41 |
| 2,607,155 A * | 8/1952 | Van Der Clute | ............ | 43/44.99 |
| 2,639,536 A * | 5/1953 | Hartman et al. | ................. | 43/41 |
| 2,697,295 A * | 12/1954 | Hinds | ............................ | 43/44.8 |
| 2,740,224 A * | 4/1956 | Heiderich | ....................... | 43/41 |
| 2,765,575 A * | 10/1956 | Gfroerer | .................... | 43/44.99 |
| 2,780,021 A * | 2/1957 | Fagg | ............................ | 43/44.99 |
| 2,781,603 A * | 2/1957 | Ganger | ............................ | 43/41 |
| 2,828,571 A * | 4/1958 | Caplan | ............................ | 43/41 |
| 2,839,866 A * | 6/1958 | Jay | ................................ | 43/41 |
| 2,870,563 A * | 1/1959 | Rose | ............................ | 43/44.4 |
| 3,034,250 A * | 5/1962 | Laba | ............................ | 43/44.8 |
| 3,047,977 A * | 8/1962 | Der-Hagopian | ............. | 43/44.8 |
| 3,101,565 A * | 8/1963 | Hoder | ........................ | 43/44.8 |
| 3,176,427 A * | 4/1965 | Hershey | ....................... | 43/44.99 |
| 3,273,277 A * | 9/1966 | Valentine | ....................... | 43/41 |
| 3,568,354 A * | 3/1971 | Yacko | ........................... | 43/44.99 |
| 3,863,383 A * | 2/1975 | Lore | ............................ | 43/44.8 |
| 3,974,591 A * | 8/1976 | Ray | ............................ | 43/44.99 |
| 4,051,620 A * | 10/1977 | Yasuda et al. | .............. | 43/44.99 |
| 4,112,553 A * | 9/1978 | Weitzner | .................... | 24/436 |
| 4,174,585 A * | 11/1979 | Beesley | ........................ | 43/55 |
| 4,218,843 A * | 8/1980 | Clarke, Jr. | ................... | 43/44.99 |
| 4,388,739 A * | 6/1983 | Martinon et al. | ............ | 383/117 |
| 4,563,832 A * | 1/1986 | Drebot | ......................... | 43/44.99 |
| 4,617,683 A * | 10/1986 | Christoff | ...................... | 383/63 |
| 4,651,389 A * | 3/1987 | Yoshida et al. | ................ | 24/433 |
| 4,788,788 A * | 12/1988 | Brockett | ....................... | 43/44.99 |
| 4,809,455 A * | 3/1989 | Smart | ......................... | 43/44.99 |
| 4,839,982 A * | 6/1989 | Wood | ......................... | 43/44.99 |
| 4,894,975 A * | 1/1990 | Ausnit | ...................... | 53/412 |
| 4,903,430 A * | 2/1990 | DeWan | ....................... | 43/44.99 |
| 4,920,684 A * | 5/1990 | Vincent | ....................... | 43/41.2 |
| 4,949,842 A * | 8/1990 | Mokiao, II | ................. | 383/117 |
| 4,960,399 A * | 10/1990 | Lyon | ........................ | 383/117 |
| 4,961,280 A * | 10/1990 | Hudson | ..................... | 43/44.99 |
| 4,974,967 A * | 12/1990 | Tsuyoshi et al. | ............ | 383/117 |
| 4,989,995 A * | 2/1991 | Rubenstein et al. | ........ | 383/117 |
| D320,060 S * | 9/1991 | Austin | ...................... | D22/144 |
| 5,050,999 A * | 9/1991 | Van Loon, III | ............... | 383/117 |
| 5,071,659 A * | 12/1991 | Shumaker | ...................... | 43/42 |
| 5,082,466 A * | 1/1992 | Rubenstein et al. | .......... | 383/117 |
| 5,216,829 A * | 6/1993 | Morton | ...................... | 43/42.06 |
| 5,235,774 A * | 8/1993 | Burghoff | .................... | 43/44.99 |
| 5,319,875 A * | 6/1994 | Brandolino | ................ | 43/42.06 |
| 5,320,429 A * | 6/1994 | Toyosawa | ................... | 383/117 |
| 5,349,777 A * | 9/1994 | Pallay et al. | ................ | 43/44.99 |
| 5,461,845 A * | 10/1995 | Yeager | ........................ | 383/66 |
| 5,497,582 A * | 3/1996 | Kuhn | ........................ | 43/44.99 |
| 6,050,018 A * | 4/2000 | Allen | ........................ | 43/44.2 |
| 6,068,401 A * | 5/2000 | Ho | ............................ | 383/66 |
| 6,174,848 B1 * | 1/2001 | Dawson et al. | .............. | 383/117 |
| 6,230,373 B1 * | 5/2001 | Wakai et al. | .................. | 24/381 |
| 6,247,260 B1 * | 6/2001 | Kandlbinder et al. | ........ | 43/44.4 |
| 6,588,138 B1 * | 7/2003 | Gilbert | ....................... | 43/42.06 |
| 6,848,210 B1 * | 2/2005 | Altman et al. | ............... | 43/44.99 |
| 6,871,442 B2 * | 3/2005 | Wyatt | ........................ | 43/44.4 |
| 6,955,006 B1 * | 10/2005 | Hastings | .................... | 43/44.99 |
| 7,056,023 B2 * | 6/2006 | Heidel | ........................ | 383/117 |
| 7,334,941 B2 * | 2/2008 | Fenster | ....................... | 383/117 |
| 2002/0067866 A1 * | 6/2002 | Moor et al. | ................. | 383/117 |
| 2003/0046856 A1 * | 3/2003 | Klapka | ....................... | 43/42.06 |
| 2005/0268525 A1 * | 12/2005 | Kalazich | .................... | 43/42.06 |
| 2006/0213110 A1 * | 9/2006 | Nhou et al. | .................. | 43/44.2 |
| 2007/0014493 A1 * | 1/2007 | Boyd | ......................... | 383/117 |
| 2007/0180757 A1 * | 8/2007 | Kalazich | ..................... | 43/44.4 |

FOREIGN PATENT DOCUMENTS

| | | | |
|---|---|---|---|
| GB | 2405070 A * | 2/2005 | |
| GB | 2411205 A * | 8/2005 | |
| JP | 64002521 A * | 1/1989 | |
| JP | 03043034 A * | 2/1991 | |
| JP | 09009835 A * | 1/1997 | |
| JP | 11225621 A * | 8/1999 | |
| JP | 2000342146 A * | 12/2000 | |
| JP | 2002360123 A * | 12/2002 | |
| JP | 2003102337 A * | 4/2003 | |
| JP | 2006081401 A * | 3/2006 | |
| JP | 2006141221 A * | 6/2006 | |
| JP | 2007089570 A * | 4/2007 | |

* cited by examiner

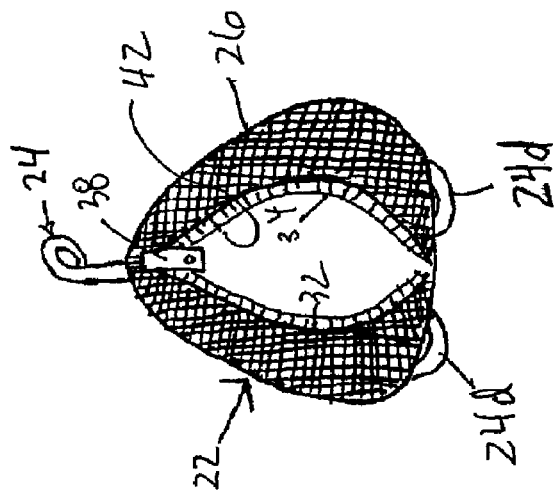
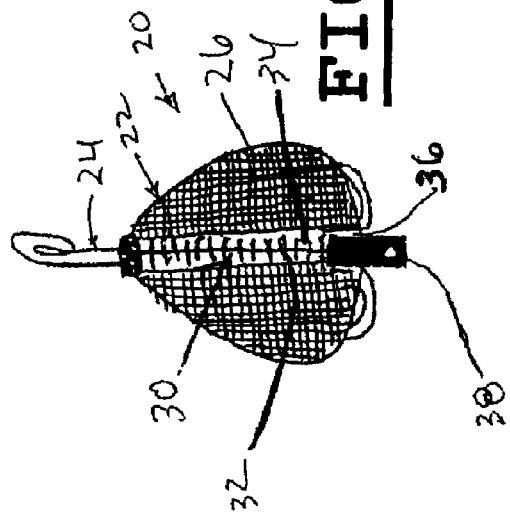
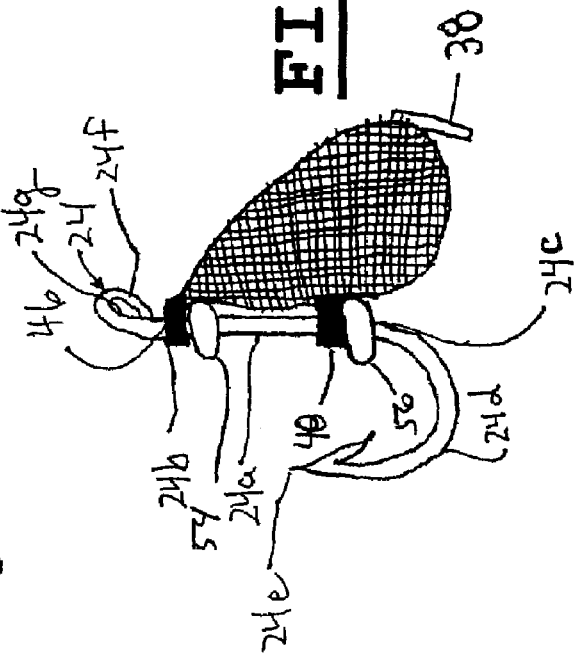

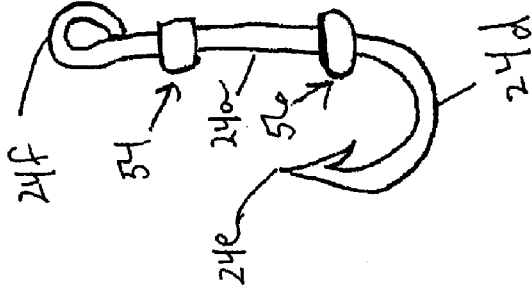
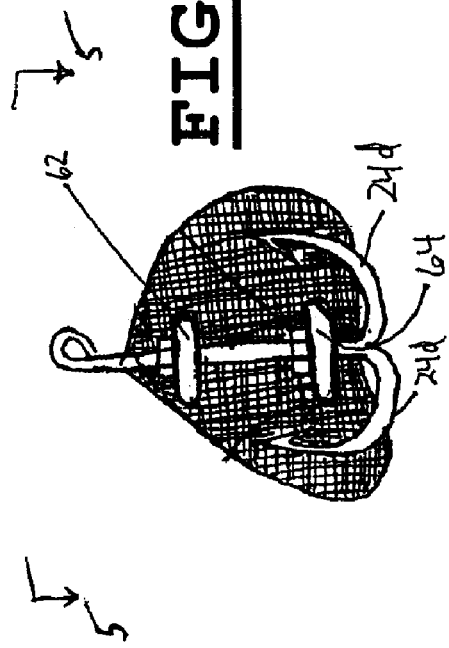
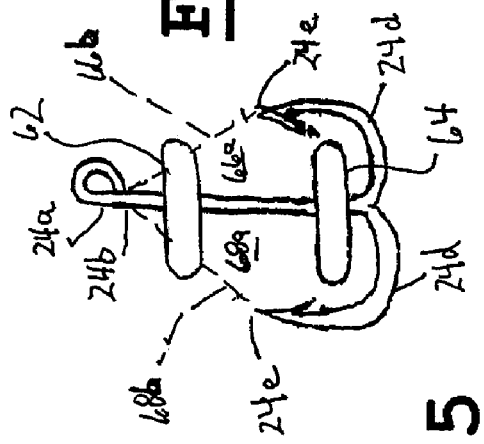
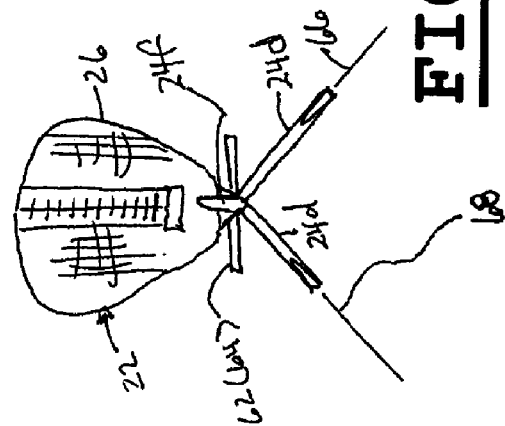

REFILLABLE BAIT BAG AND INTEGRATED HOOK

BACKGROUND OF THE INVENTION

In fishing, there are many methods of attracting game fish, including live bait, artificial lures, and a combination of both. Often, artificial lures are used to imitate live prey and are designed to be drawn through the water. Other times, live bait is impaled on a hook and plunged into the water with hopes that its movement will attract predators. The use of live bait has proven to be more effective with certain types of game fish, such as catfish, because of its genuine smell and taste. A modification of this method has seen that it is advantageous to attach minced bait to the hook to minimize the chance that the bait will be lost to weeds or predators, while accentuating the authentic taste and smell.

When a fisherman desires to use live bait, the bait is typically impaled on a hook. However, by forcing the hook through the bait, the bait is thereby injured and will die relatively quickly. Once dead, the bait in incapable of independent movement and will not exhibit the distress signals that attract fish. Forcing a hook through the bait also weakens the tissue of the bait which makes the bait susceptible to falling off the hook.

In addition to the visual attraction of the bait, the scent and also the distress signals given off by small animals or insects are used by fish to locate food sources, and hence can be used to attract fish to a baited hook. A wide variety of pellets, which contain various scents intended to attract different fish are now available to fishermen. However, this bait is relatively expensive and difficult to retain on a conventional hook.

The present inventor has recognized the need to provide a fishing lure in which the bait is securely retained, and which improves the attractiveness of the bait to the fish.

If a bait animal or insect can be retained alive then it will continue to emit distress signals, e.g. vibrations of various frequencies which may or may not be audible to the human ear, that attract appropriate game fish. The present inventor has recognized the need to provide a fishing lure or bait holder in which live bait remains alive and intact for a lengthy period.

It is known to use an attachment apparatus, such as a permeable bag or basket, near the hook to secure the bait while releasing the desired attractants. Such apparatuses are described for example in U.S. Pat. Nos. 856,867; 2,780,021; and 5,319,875.

One problem with prior known bait devices is with the manual dexterity associated with placing the bait on the hook or in the cage or cavity while in a boat or standing in a stream in weather that is less than perfect. A fisherman's hands can get cold, wet and slippery from repeated dunking in the water or in releasing fish from the hook. Making snapping and unsnapping the parts of a lure a difficult and a time-consuming operation.

Lures can undergo much stress during casting of the lure, reeling it through the water, and fighting a captured fish. In each of these situations, great stress is placed on the lure, especially on the assembled parts. The present inventor has recognized the need for a rugged and reusable bit device or lure.

The present inventor has recognized the desirability for a bait attachment bag that does not interfere or obstruct the effectiveness of the hook in prior known bait bags, such as in U.S. Patents 856,867 and 2,780,021, the bag engulfs the hook and may, on occasion, reduce the hook's likelihood of snaring the desired game fish.

The present inventor has recognized the desirability for providing a bait attachment bag that is easy to repeatedly open, refill and close, or open to clean. In prior known bait bags, the bag needs to be untied and retied in order to change the bait or to clean the bag. This is not an effortless task, especially when doing so after the bait has been dipped in cold water and exposed to muck and weeds.

The present inventor has recognized the desirability for a bait attachment bag that has significant longevity regardless of getting caught in weeds and being submerged in water for extended periods of time. Prior art bait bags, such as in U.S. Pat. No. 5,319,875 that are made of metal or contain metal parts may have reduced usability if extended exposure to water has caused rusted parts.

The present inventor has also recognized the desirability for a bait bag that is easily opened, filled and closed by a fisherman with limited manual dexterity, such as an elderly fisherman or one who has lost the use of a hand.

SUMMARY OF THE INVENTION

The invention provides a rugged bait bag and hook combination that is easily cleaned and filled. The invention provides a bait bag that can be filled with live bait or with bait food product. The invention provides a bait bag that is easily refilled by fishermen with limited manual dexterity. The invention provides a bait bag and hook combination that includes provision to prevent interference by the bag of the hook-function of the hook or hooks.

The present invention provides an improved bait bag and hook combination comprising a bag for holding bait material and a hook connected to the bag. According to the invention the bag includes a re-closable opening, preferably a slit-like opening closable by a slide fastener, such as a zipper. Furthermore the hook can include a mechanism to prevent movement of the bag on the hook to prevent blocking of the hook by the bag.

According to the preferred embodiment of the invention, a bait bag and hook combination includes a bag having a water permeable bag body with a re-closable opening. A fishhook includes a hook shaft and a hook end portion extending from the hook shaft. The hook shaft is connected to the bag body with the hook end portion extending away from the bag body.

According to one aspect of the invention, one or more stoppers are arranged on the hook to prevent the bag from sliding axially on the hook shaft.

According to another aspect of the invention, at least one wing is carried by the hook shaft to prevent rotation of the bag body about the hook shaft. Accordingly, the hook has a hook shaft with a first end and second end and a hook end portion extending out from the hook shaft at the second end to a free end of the hook end portion. The hook shaft and the hook end portion, and an imaginary straight line drawn between the free end of the hook end portion and the first end of the hook shaft define a plane area. The bag and wing are carried on the hook shaft in such a way that the bag is prevented from entering the plane area.

According to another aspect of the invention the wing and stopper are formed together and carried by the hook shaft to prevent rotation of the bag body about the hook shaft and to also prevent sliding of the bag body in a direction parallel to a length of the hook shaft. Preferably, the hook shaft, the wing and the stopper are all formed together as a cast steel piece.

According to another aspect of the invention the slide fastener comprises first and second rows of plastic interlocking teeth aligned across the slit-like opening, and a slide fastener slider arranged to slide on the rows of interlocking teeth to engage or disengage the teeth.

According to another aspect of the invention the bag body is composed of a mesh material. Preferably, the mesh material is made of a woven nylon.

Although the present invention is particularly advantageous for fishing catfish, it could also be advantageous for other type fishing as well such as commercial fishing, trout lines, etc.

Numerous other advantages and features of the present invention will be become readily apparent from the following detailed description of the invention and the embodiments thereof, and from the accompanying drawings.

BRIEF DESCRIPTION OF THE DRAWINGS

FIG. 1 is a rear view of the present invention bait bag and hook combination with the bag in the closed position;

FIG. 2 is a rear view of the bait bag and hook combination of FIG. 1 with the bag in the open position;

FIG. 3 is a side view of the bait bag and hook combination of FIG. 1;

FIG. 3A is a side view of the bait bag and hook combination of FIG. 3 with the bag omitted FIG. 4 is a front view of an alternate embodiment of the bait bag and hook combination of the present invention;

FIG. 4A is a front view of the bait bag and hook combination of FIG. 4 with the bag omitted;

FIG. 5 is a plan view of the FIG. 4;

DETAILED DESCRIPTION OF THE PREFERRED EMBODIMENTS

Figure 6:
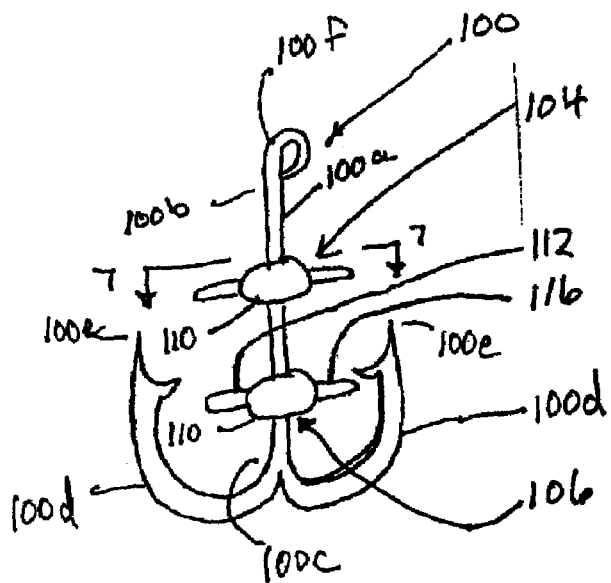
FIG. 6 is an front view of an alternate embodiment bait bag and hook combination with the bag omitted.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a bait bag and hook combination 20 having a bag 22 and a hook 24. The bag includes a bag body 26 with an attached slide fastener 30. The bag body comprises a mesh or other strong but water permeable material, such as woven nylon. The slide fastener 30 is shown in a closed position.

The slide fastener 30 includes a first row 32 and a second row 34 of engageable elements, and a slide fastener slider 36 having a pull tab 38. The slide fastener is preferably of a non-metallic construction such composed of polymer or plastic materials. Plastic slide fasteners are well known. Examples of such slide fasteners are disclosed in U.S. Pat. Nos. 6,230,373; 4,112,553; and 4,651,389, all herein incorporated by reference.

FIG. 2 illustrates the combination 20 of FIG. 1 with the slide fastener 30 in an open position, with the rows 32, 34 of engageable elements disengaged. The opened rows 32, 34 reveal a slit-like opening 42 in the bag body 22. Through this opening 42 bait material, such as minced bait food or worms, is placed within the bag and the bag can be re-closed to the configuration of FIG. 1.

FIGS. 3 and 3A illustrate the hook 24 in more detail. The hook 24 includes a hook shaft 24a having a first end 24b and a second end 24c. One or more hook end portions 24d extends from the second end 24c to a free end 24e. According to the exemplary embodiment two hook end portions 24d are provided. A hook eye portion 24f extends from the first end 24b. The eye portion provides an eye 24g for attachment by a fishing line (not shown). The bag body 26 includes attachment threads forming woven bands 46, 48 that encircle the hook shaft 24a to attach the bag 22 to the hook 24.

Stoppers 54, 56 are formed with or are attached to hook shaft 24a beneath the bands 46, 48 prevent sliding of the woven bands 46, 48 down the hook shaft 24a. The hook eye portion 24f also prevents the top band 46 from sliding up the hook shaft 24a. The stoppers can be different shapes but a ring shape is suitable for performing the function. Preferably the stoppers are devoid of sharp corners to avoid damaging the bag.

FIGS. 4-5 illustrate a further embodiment of the invention wherein the illustrated stoppers are replaced by wings 62, 64. The wings 62, 64 are shown in profile in FIG. 5 and comprise elongated plates. The wings are formed with or attached to the hook shaft 24a. The wings are long enough in the direction transverse to the length of the hook shaft 24a to prevent the bag body 26 from rotating about the hook shaft 24a and interfering with the hook end portions 24d.

The wings 62, 64 extend laterally from the hook shaft 24a on opposite sides of the hook shaft 24a and have axes which generally extend in a common plane which is located between the first end 24b and second end 24c of the hook shaft 24a.

The hook end portions 24d and the hook shaft 24a generally define two vertical planes 66, 68. The wings 62, 64 prevent the bag body 26 from entering these planes, particularly a plane area 66a, 68a (FIG. 4A) within each plane 66, 68. The plane areas 66a, 68a are bounded by the hook shaft 24a, the hook end portion 24d and an imaginary line 66a, 68a (FIG. 4A) drawn between the free end 24e of each hook end portion 24d and the first end 24b of the hook shaft 24a. By preventing the rotation of the bag body 26 to enter the plane areas 66a, 68a an entanglement with the hook end portions 24d is prevented, as well as blockage of the hook end portion 24a which could inhibit snaring of the hook end portions 24d to the mouth of the fish.

Figure 7:
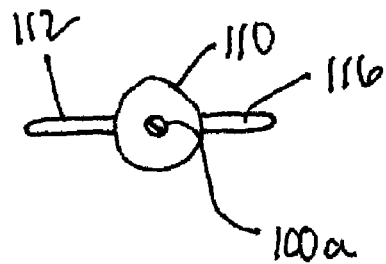
FIG. 7 is a sectional view taken generally along line 7-7 of FIG. 6.

FIGS. 6 and 7 illustrate an alternate embodiment hook 100. The hook 100 includes a hook shaft 100a having a first end 100b and a second end 100c. One or more hook end portions 100d extends from the second end 100c to a free end 100e. According to this embodiment two hook end portions 100d are provided. A hook eye portion 100f extends from the first end 100b. The eye portion provides an eye 100g for attachment by a fishing line (not shown). The bag body 26 (not shown) is mounted to the hook shaft as described above in FIG. 3.

Retainers 104, 106 are formed with or fixedly attached to hook shaft 100a. Each retainer 104, 106 includes a ring shaped stopper 110 and two extending wings 112, 116, the stopper and wings formed in unitary fashion. The wings 112, 116 are shown in profile in FIG. 7 and comprise elongated plates or tabs. The wings are long enough in the direction transverse to the length of the hook shaft 100a to prevent the bag body 26 from rotating about the hook shaft 100a and interfering with the hook end portions 100d.

The wings 112, 116 extend laterally from the hook shaft 100a on opposite sides of the hook shaft 100a and have axes which generally extend in a common plane which is located between the first end 100b and second end 100c of the hook shaft 100a.

The stoppers 110 and wings 112, 116 preferably are devoid of any sharp corners which could damage the bag 22. Each retainer 104, 106, including a stopper 110 and wings 112, 116, is preferably formed in unitary fashion with the hook or hooks, as a cast steel part.

The stoppers 110 and wings 112, 116 function in the same fashion as the stoppers and wings heretofore described and act to prevent axial sliding of the bag body 26 and support of the bag body on the hook shaft and prevent rotation of the bag body 26 about the hook shaft 100a. This prevents interference between the bag body and the hooks.

Although the illustrated embodiment discloses a slide fastener, such as a zipper, other mechanisms to close bags are encompassed by the invention including hook and loop fastener strips arranged on opposite sides of the slit-like seam, buttons, snaps or a ZIP LOCK bag closure or closures such as disclosed in U.S. Pat. Nos. 5,461,845; 4,617,683 or 4,894,975, herein incorporated by reference.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A bait bag and hook combination, comprising:
a hook having a hook shaft with a first end and a second end and a hook end portion extending out from said hook shaft at said second end to a free end of said hook end portion, and said hook shaft, said hook end portion and an imaginary straight line drawn between said free end of said hook end portion and said first end of said hook shaft defining a plane area therebetween which extends in a single plane;
a bag having a water permeable bag body with a re-closable opening, and said bag being mounted on said hook shaft in such a way that said bag is guided away from entering said plane area; and
at least one retainer carried by said hook shaft, said at least one retainer having wings extending laterally from said hook shaft on opposite sides of said hook shaft to prevent rotation of said bag body about said hook shaft, said wings having axes which generally extend in a common plane which is located between said first and second ends of said hook shaft.

2. The bait bag and hook combination according to claim 1, wherein said at least one retainer further comprising a stopper configured to prevent sliding of said bag body in a direction parallel to a length of said hook shaft.

3. The bait bag and hook combination according to claim 1, wherein said re-closable opening comprises a slit-like opening.

4. The bait bag and hook combination according to claim 3, wherein said bag comprises a slide fastener fixed to said bag body and operable to open and close said slit-like opening.

5. The bait bag and hook combination according to claim 4, wherein said at least one retainer is configured to also prevent sliding of the bag body in a direction parallel to a length of said hook shaft.

6. The bait bag and hook combination according to claim 4, wherein said at least one retainer further comprising a stopper configured to prevent sliding of said bag body in a direction parallel to a length of said hook shaft.

7. The bait bag and hook combination according to claim 4, wherein said slide fastener comprises first and second rows of plastic interlocking teeth aligned across said slit-like opening, and a slide fastener slider arranged to slide on said rows of interlocking teeth to engage or disengage said teeth.

8. The bait bag and hook combination according to claim 1, wherein said bag body is composed of a mesh material.

9. The bait bag and hood combination according to claim 8, wherein said mesh material is made of a woven nylon.

10. A bait bag and hook combination, comprising:
a hook having a hook shaft with a first end and second end and a hook end portion extending out from said hook shaft at said second end to a free end of said hook end portion, said hook shaft and said hook end portion, and an imaginary straight line drawn between said free end of said hook end portion and said first end of said hook shaft defining a plane area therebetween which extends in a single plane;
a bag that is mounted on said hook shaft in such a way that said bag is guided away from entering said plane area, preventing tangling of said hook end portion and said bag, and said bag comprises a slit-like opening elongated in a direction parallel to said hook shaft; and
at least one retainer carried by said hook shaft, said at least one retainer having wings extending laterally from said hook shaft on opposite sides of said hook shaft to prevent rotation of said bag about said hook shaft, said wings having axes which generally extend in a common plane which is located between said first and second ends of said hook shaft.

11. The bait bag and hook combination according to claim 10, wherein said at least one retainer is configured to also prevent sliding of the bag in a direction parallel to a length of said hook shaft.

12. The bait bag and hook combination according to claim 10, wherein said at least one retainer further comprising a stopper configured to prevent sliding of said bag in a direction parallel to a length of said hook shaft.

* * * * *